(12) United States Patent
Oka

(10) Patent No.: US 7,952,733 B2
(45) Date of Patent: May 31, 2011

(54) IMAGE TRANSFER SYSTEM AND IMAGE TRANSFER METHOD

(75) Inventor: Koji Oka, Machida (JP)

(73) Assignee: Ricoh Company. Ltd., Tokyo (JP)

( * ) Notice: Subject to any disclaimer, the term of this patent is extended or adjusted under 35 U.S.C. 154(b) by 1272 days.

(21) Appl. No.: 11/494,740

(22) Filed: Jul. 28, 2006

(65) Prior Publication Data

US 2007/0030512 A1    Feb. 8, 2007

(30) Foreign Application Priority Data

Jul. 29, 2005   (JP) ................................ 2005-221046
Jun. 14, 2006   (JP) ................................ 2006-165046

(51) Int. Cl.
  G06K 15/00    (2006.01)
  G06F 3/12     (2006.01)
(52) U.S. Cl. ..................................... 358/1.14; 358/1.15
(58) Field of Classification Search ................. 358/1.15, 358/402, 1.1, 1.13, 1.14
  See application file for complete search history.

(56) References Cited

U.S. PATENT DOCUMENTS

| | | | |
|---|---|---|---|
| 6,947,163 B2 * | 9/2005 | Takemura ..................... | 358/1.15 |
| 7,027,169 B1 * | 4/2006 | Morikawa et al. ........... | 358/1.14 |
| 7,079,269 B2 * | 7/2006 | Teeuwen et al. ............. | 358/1.15 |
| 2004/0125214 A1 | 7/2004 | Oka et al. | |
| 2005/0012828 A1 | 1/2005 | Oka | |
| 2005/0213147 A1 * | 9/2005 | Minatogawa ................ | 358/1.15 |

FOREIGN PATENT DOCUMENTS

| | | |
|---|---|---|
| JP | 2002-199324 | 7/2002 |
| JP | 2004-118426 | 4/2004 |
| JP | 2004-159281 | 6/2004 |
| JP | 2005-151470 | 6/2005 |
| JP | 2005-151521 | 6/2005 |
| JP | 2005-215495 | 8/2005 |
| JP | 2006-81049 | 3/2006 |
| JP | 2006-238145 | 9/2006 |
| JP | 2006-245687 | 9/2006 |
| JP | 2006-277720 | 10/2006 |
| JP | 2007-36979 | 2/2007 |
| JP | 2007-60629 | 3/2007 |
| JP | 2007-60631 | 3/2007 |
| WO | WO 2005/017738 A1 | 2/2005 |

OTHER PUBLICATIONS

Office Action issued Dec. 14, 2010, in Japanese Patent Application No. 2006-165046.

* cited by examiner

Primary Examiner — Benny Q Tieu
Assistant Examiner — Sunil Chacko
(74) Attorney, Agent, or Firm — Oblon, Spivak, McClelland, Maier & Neustadt, L.L.P.

(57) ABSTRACT

In an image transfer system that an information terminal device and a plurality of printers are connected to a network to be able to output image data in the information terminal device to any of the printers through the network, the information terminal device broadcasts a searching inquiry request to each of the printers, each of the printers sends a searching inquiry response having an IP address of each of the printers relative to the searching inquiry request, and when a printer to output the image data in the information terminal device is selected from each of the printers, the printer sends a communication start request command to the information terminal device.

9 Claims, 11 Drawing Sheets

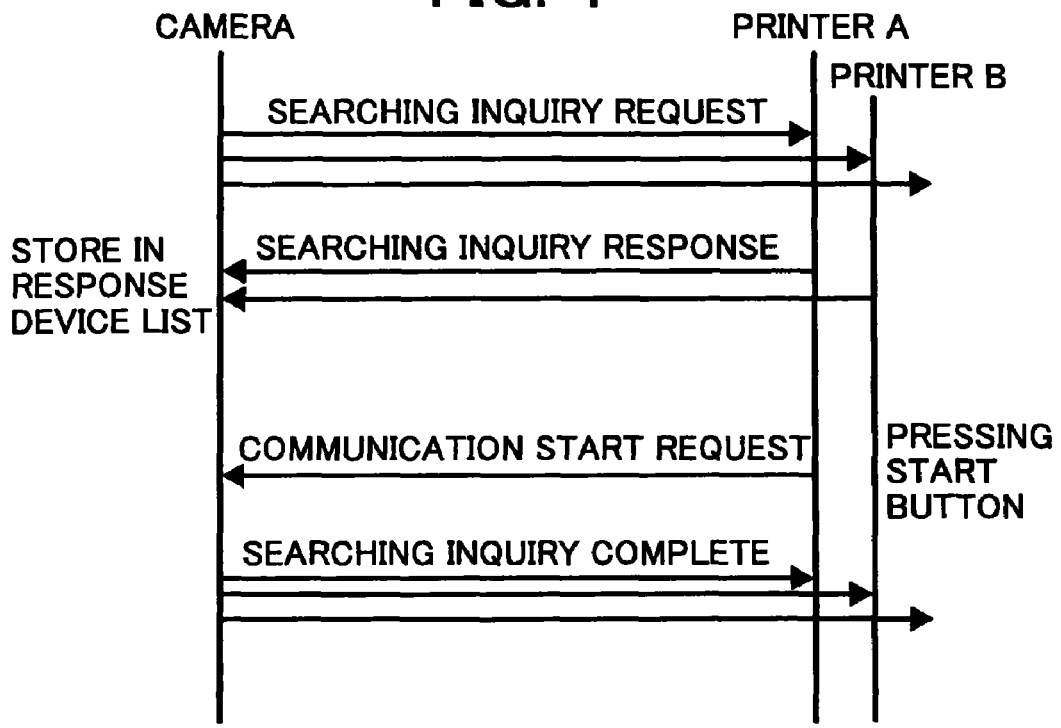
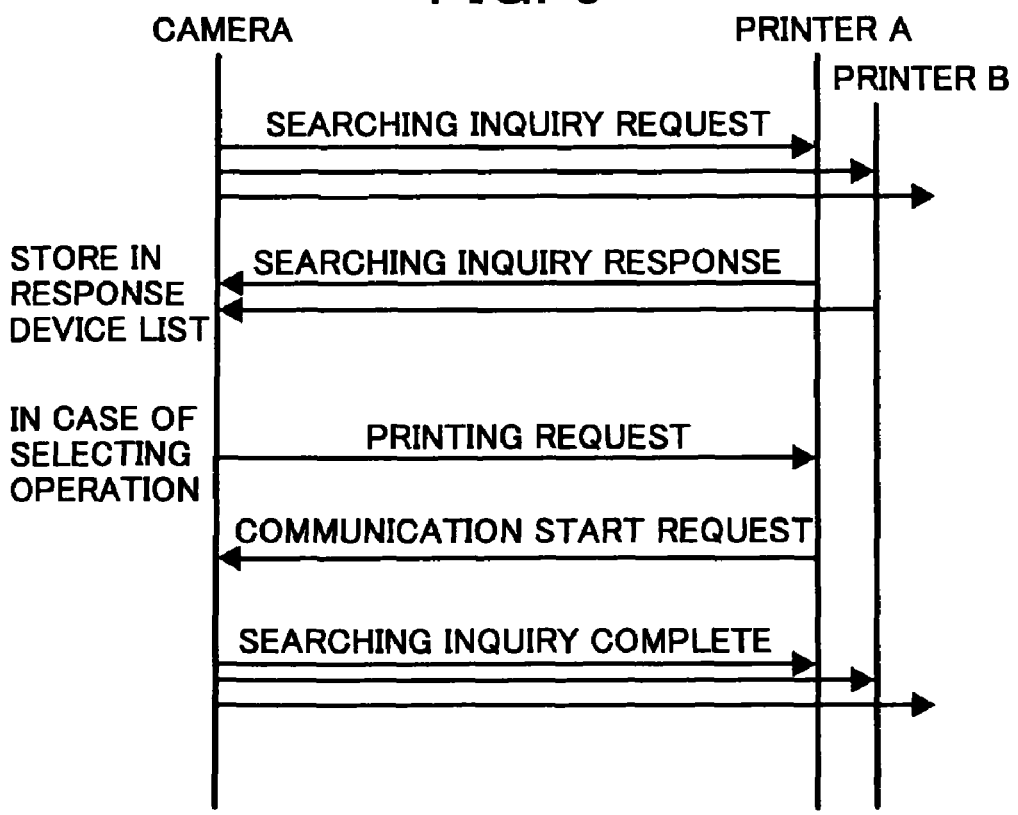

FIG. 6

SEARCHING INQUIRY REQUEST PACKET

| | |
|---|---|
| COMMAND ID: SEARCHING INQUIRY REQUEST | 0 |
| TERMINAL TYPE: DIGITAL CAMERA | 1 |
| TERMINAL NAME: CAMERA A | 2 |
| | 3 |

FIG. 7

SEARCHING INQUIRY RESPONSE PACKET

| | |
|---|---|
| COMMAND ID: SEARCHING INQUIRY RESPONSE | 0 |
| TERMINAL TYPE: PRINTER | 1 |
| TERMINAL NAME: PRINTER A | 2 |
| | 3 |

FIG. 8

PRINTING REQUEST PACKET

| | |
|---|---|
| COMMAND ID: PRINTING REQUEST | 0 |
| TERMINAL TYPE: DIGITAL CAMERA | 1 |
| TERMINAL NAME: CAMERA A | 2 |
| | 3 |

FIG. 13

PRINTER CONFIRMATION REQUEST PACKET

| | |
|---|---|
| COMMAND ID: PRINTER CONFIRMATION REQUEST | 0 |
| TERMINAL TYPE : PRINTER | 1 |
| TERMINAL NAME: PRINTER A | 2 |
| | 3 |

FIG. 14

SEARCHING INQUIRY RECEIVING REGISTRATION TABLE

| | |
|---|---|
| CAMERA A: IP ADDRESS | 0 |
| CAMERA B: IP ADDRESS | 1 |
| CAMERA D: IP ADDRESS | 2 |
| ⋮ | 3 |
| ⋮ | |
| NOT USED | N |

FIG. 16

PRINTING IS CONFIRMED FROM PRINTER A.
(IP ADDRESS: 192.168.10.20)

START PRINTING?

| OK | NG |

FIG. 17

PRINTER LIST
SELECT PRINTER FOR PRINTING

| PRINTER A |
| PRINTER B |
| |
| |

FIG. 18

ETHERNET PACKET STRUCTURE

| PREAMBLE | ADDRESS MAC ADDRESS | SOURCE MAC ADDRESS | TYPE | DATA A | FCS |
|---|---|---|---|---|---|

IP PACKET STRUCTURE

| FRAME LENGTH, ETC. | IDENTIFIER, ETC. | PROTOCOL NUMBER, ETC. | DESTINATION IP ADDRESS | ADDRESS IP ADDRESS | DATA B |
|---|---|---|---|---|---|

TCP PACKET STRUCTURE

| DESTINATION PORT NUMBER | ADDRESS PORT NUMBER | WINDOW SIZE, ETC. | OTHER HEADER | DATA C |
|---|---|---|---|---|

FIG. 19

| | | |
|---|---|---|
| CAMERA A: IP ADDRESS | (192.168.1.10) | 0 |
| | "CAMERA -A" | 1 |
| CAMERA B: IP ADDRESS | (192.168.1.20) | 2 |
| | "CAMERA -B" | 3 |
| CAMERA D: IP ADDRESS | (192.168.1.30) | |
| | "CAMERA -D" | |
| ⋮ | ⋮ | |
| | | N |
| NOT USED | | |

IMAGE TRANSFER SYSTEM AND IMAGE TRANSFER METHOD

BACKGROUND

1. Field of the Invention

The present invention relates to an image transfer system and an image transfer method that an information terminal device such as a digital camera and a plurality of printers are connected to a network to be able to output image data in the information terminal device to any of the printers via the network.

2. Description of Related Art

There has been, conventionally, known an image transfer system that a digital camera and a plurality of printers are connected to a local area network, so as to send image data in the digital camera to any of printers via the local area network to print out the image (reference to JP2004-159281A).

There has been also known a digital camera, which corresponds to PTPIP. In such a digital camera corresponding to PTPIP, if a connection disclosure request is received from a personal computer as a client, connection is established between the personal computer and the digital camera in response to the request. Thereby, the image data in the digital camera can be automatically transferred.

However, in the above art, since a plurality of printers is connected to the local area network, a user often makes mistake in selecting a printer. For example, if a user makes mistake in selecting a printer although a neighbor printer is desired for printing, an image is printed out by a distant printer, resulting in trouble for getting the printed image.

SUMMARY

It is, therefore, an object of the present invention to provide an image transfer system and image transfer method, which can securely print out image data in an image terminal device by a printer desired by a user.

In order to achieve the above object, a first aspect of the present invention is directed to an image transfer system that an information terminal device and a plurality of printers are connected to a network to be able to output image data in the information terminal device to any of the printers through the network, wherein the information terminal device broadcasts a searching inquiry request to each of the printers, each of the printers sends a searching inquiry response having an IP address of each of the printers relative to the searching inquiry request, and when a printer to output the image data in the information terminal device is selected from each of the printers, the printer sends a communication start request command to the information terminal device.

According to the above structure, if a user selects a printer to output the image data in the information terminal device, the printer sends a communication start request command to the information terminal device. As a result, a connection is established between the selected printer and the information terminal device. Thereby, the image data in the information terminal device can be printed out by the printer.

The following (1) to (4) are preferred embodiments of the image transfer system according to the present invention. Any combinations of (1) to (4) are also preferred embodiments of the image transfer system according to the present invention, unless any contradiction occurs.

(1) The printer to output the image data is selected by pressing a start button of the printer.

(2) The information terminal device comprises a function which selects the printer to output the image data from the information terminal device side.

(3) A plurality of information terminal devices is connected to the network.

(4) The information terminal device comprises a digital camera.

A second aspect of the present invention is directed to an image transfer method, comprising the steps of: connecting an information terminal device and a plurality of printers to a network, so as to output image data in the information terminal device to any of the printers via the network; broadcasting a searching inquiry request to each of the printers by the information terminal device; sending a searching inquiry response including an IP address of each of the printers relative to the searching inquiry request by the printer; and when a printer to output the image data in the terminal device is selected from each of the printers, sending a communication start request command to the information terminal device by the printer.

EFFECTS OF THE PRESENT INVENTION

According to the present invention, image data in an information terminal device can be securely printed out by a printer desired by a user.

The present application is based on and claims priorities from Japanese application Nos. 2005-221046, filed on Jul. 29, 2005, and 2006-165046, filed on Jun. 14, 2006, the disclosures of which are hereby incorporated by reference herein in their entirety.

BRIEF DESCRIPTION OF THE DRAWINGS

FIG. 4 is a sequence view showing a procedure which sends a communication start request command to a camera from a printer side by pressing a start button of printer.

FIG. 5 is a sequence view showing a procedure which sends a communication start request command to a camera from a printer by sending a trigger signal to a printer from a camera side.

FIG. 6 is a view illustrating a packet structure of searching inquiry request.

FIG. 7 is a view illustrating a packet structure of searching inquiry response.

FIG. 8 is a view illustrating a packet structure of printing request.

FIG. 13 is a view showing a packet structure of printer confirmation request.

FIG. 14 is a view illustrating a structure of searching inquiry receiving registration table.

FIG. 16 is a view illustrating a printing confirmation screen.

FIG. 17 is a view showing one example of printer selecting screen.

FIG. 18 is a view illustrating an example of data packet structure.

FIG. 19 is a view illustrating one example of a searching inquiry receiving registration table.

DETAILED DESCRIPTION OF THE PREFERRED EMBODIMENTS

Hereinbelow, embodiments of the present invention will be explained with reference to the drawings.

First Embodiment

Figure 1:
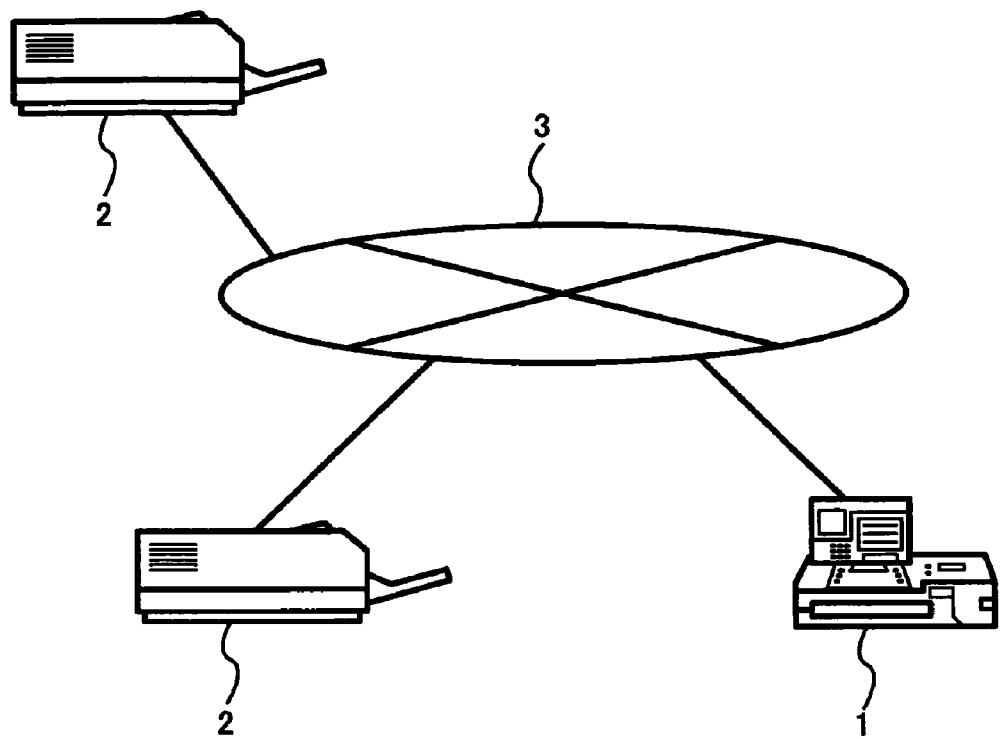
FIG. 1 shows a schematic diagram of an image transfer system according to a first embodiment.

FIG. 1 shows a schematic structure of image transfer system according to the first embodiment. In this image transfer system, as shown in FIG. 1, a digital camera 1 as an information terminal device and a plurality of printers 2 (here, two printers) are connected to a local area network 3 (hereinafter, referred to as LAN), and image data in the digital camera 1 can be printed out by any of the printers 2 via the LAN 3.

Figure 2:
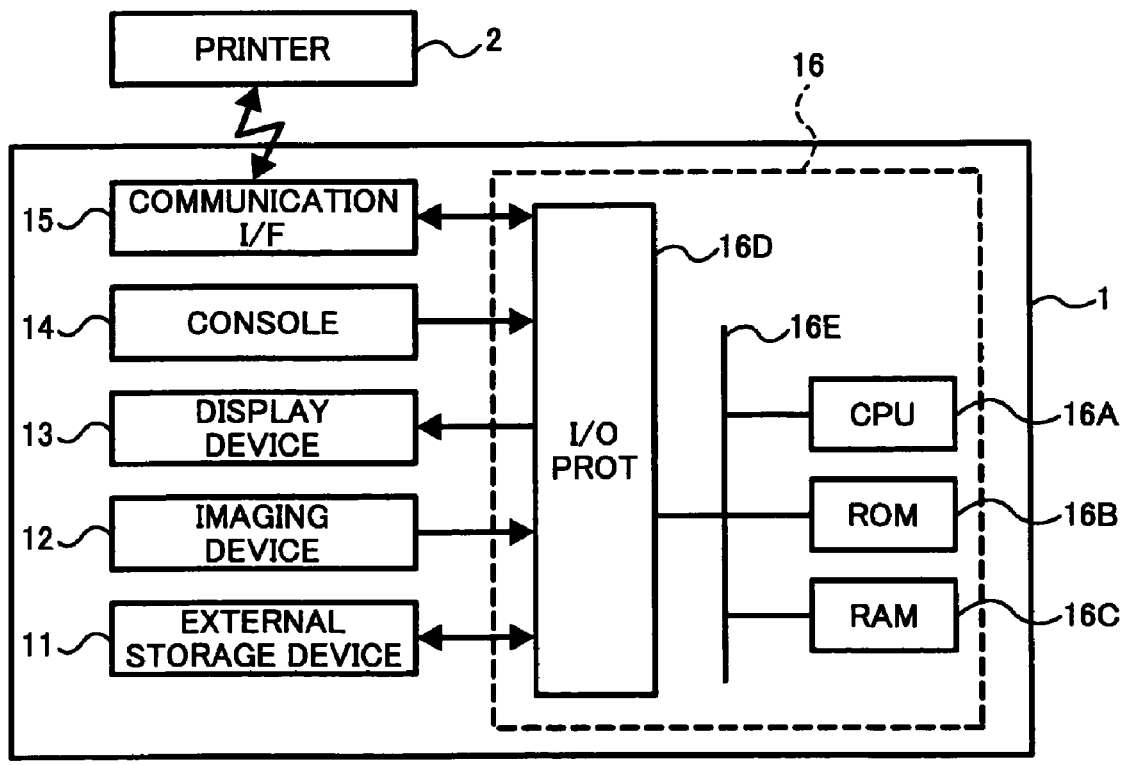
FIG. 2 is a block diagram illustrating an internal structure of a digital camera.

FIG. 2 is a block diagram showing an internal structure of the digital camera 1. The digital camera 1 communicates with the printers 2 by means of USB or Blue Tooth. The digital camera 1 also comprises an external storage device 11 such as a flush memory for storing information, an imaging device 12 of an input portion of image information such as a CCD and AD converter, a display device 13 of various information, a console 14 which conducts input from outside, a communication I/F portion 15 which controls the interface with an external printer, and an entire control device 16 which controls the entire digital camera.

The entire control device 16 comprises a known microcomputer. In the entire control device 16, a CPU 16A, a ROM 16B, a RAM 16C and an I/O port (input and output port) 16D are connected via a bus line 16E.

Figure 3:
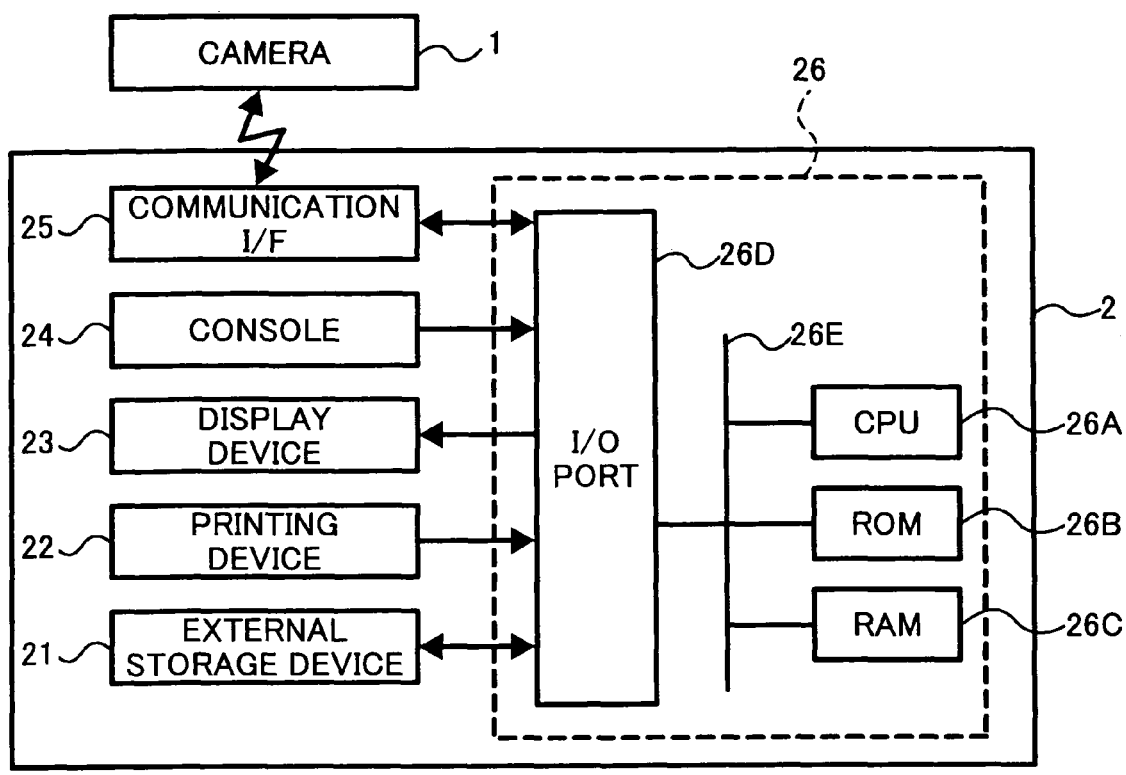
FIG. 3 is a block diagram illustrating an internal structure of a printer.

FIG. 3 is a block diagram showing an internal structure of a printer 2. The printer 2 comprises an external storage device 21 such as a flash memory for storing information, a printing device 22 which performs printing to a paper, a display device 23 of various information, a console 24 which conducts input from outside, a communication I/F portion 25 which controls the interface with an external digital camera and an entire control device 26 which controls the enter printer.

The entire control device 26 comprises a known microcomputer. In the entire control device 26, a CPU 26A, a ROM 26B, a RAM 26C and an I/O port (input and output port) 26D are connected by a bus line 26E.

Next, it will be explained about a communication procedure till the connection between the digital camera 1 and a plurality of printers 2 is established in the image transfer system having the above structure.

FIG. 4 shows a procedure which sends a communication start request command to a camera (digital camera) from a printer A side by pressing a start button (console 24) of the printer A. At first, as shown in FIG. 4, the camera broadcasts a searching inquiry request to a plurality of printers A, B . . . . In this case, a packet structure of the searching inquiry request is as shown in FIG. 6.

If the searching inquiry request is broadcasted, each of the printers A, B . . . sends a searching inquiry response to the camera, and the camera stores the response in a response device list. In this case, a packet structure of the searching inquiry response is as shown in FIG. 7.

If a user desires to print out image data in the camera by the printer A from each of the printers A, B . . . , and presses a start button of the printer A, the communication start request command is sent to the camera from the printer A. Thereby, the connection between the camera and printer A is established. Finally, the camera broadcasts a searching inquiry complete packet to each of the printers A, B . . . .

Another printer (for example the printer B) can not send the communication start request if the searching inquiry complete packet is received. More particularly, the printer can send the communication start request only between the searching inquiry request to the searching inquiry complete. If a plurality of cameras is used, it is better to use a method of providing an available period which can send the communication start request as just described.

FIG. 5 shows a procedure which send the communication start request command to the camera from the printer A by sending a trigger signal to the printer A from the camera side, without pressing the start button of the printer A. At first, as shown in FIG. 5, the camera broadcasts the searching inquiry request to a plurality of printers A, B . . . . In this case, the packet structure of searching inquiry request is as shown in FIG. 6.

If the searching inquiry request is broadcasted, each of the printers A, B . . . sends the searching inquiry response to the camera, and the camera stores the response in the response device list. In this case, the packet structure of searching inquiry response is as shown in FIG. 7.

Next, if a user desires to print out image data in the camera by the printer A from each of the printers A, B . . . , and selects the printer A from the console 14 of the camera, the printing request is sent to the printer A from the camera side. In this case, a packet structure of the printing request is as shown in FIG. 8. In addition, FIG. 17 illustrates one example of operation screen in the console 14.

If the printer A receives the printing request from the camera, the printer A sends the communication start request to the camera. Thereby, the connection between the camera and the printer A is established. Finally, the camera broadcasts the searching inquiry complete packet to each of the printers A, B . . . .

Next, it will be explained about operation of the image transfer system having the above structure with reference to the flowcharts shown in FIGS. 9, 10. In addition, FIG. 9 shows the operation in the camera 1 side and FIG. 10 shows the operation in the printer 2 side.

Figure 9:
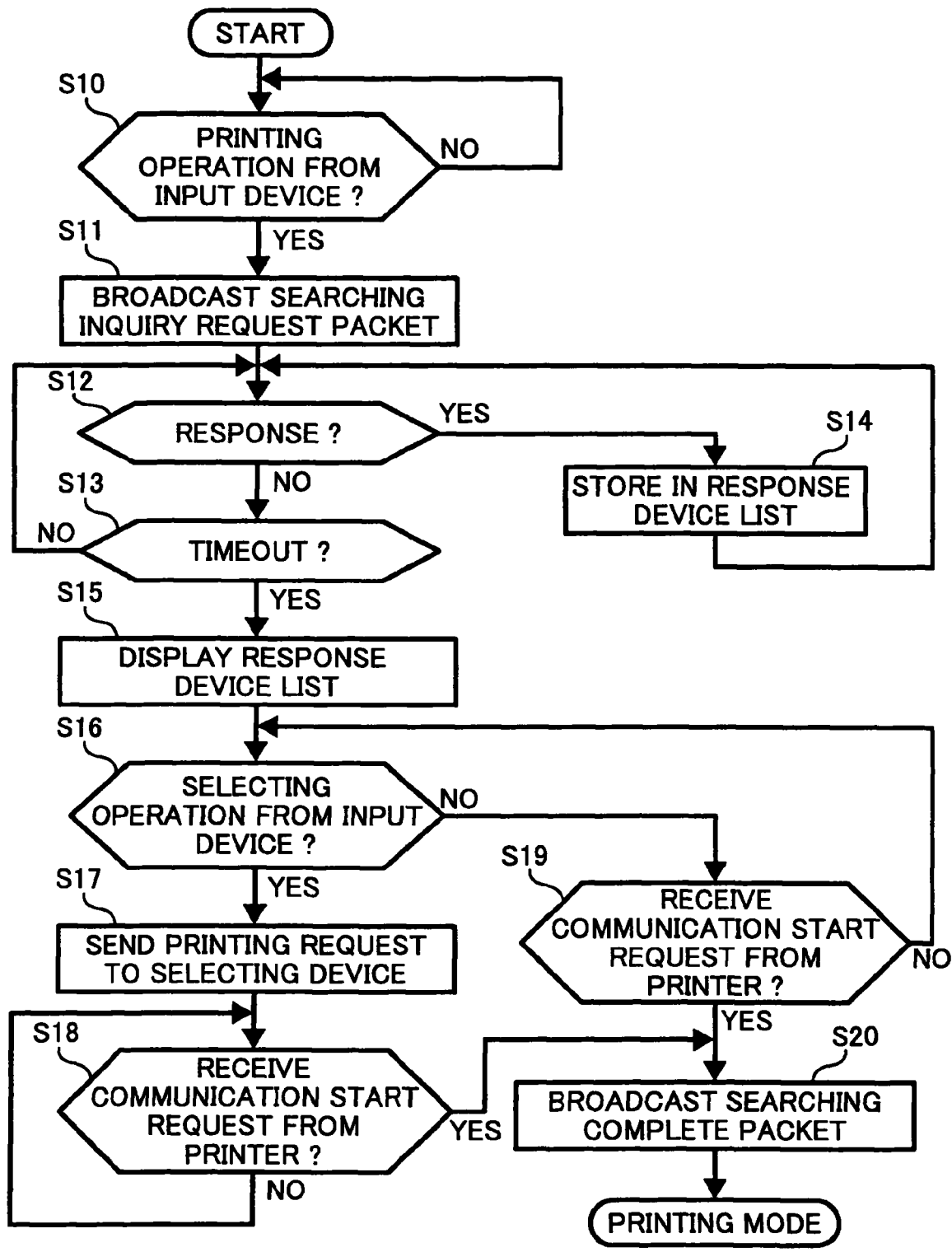
FIG. 9 shows a flowchart explaining operation of a camera side.
Figure 10:
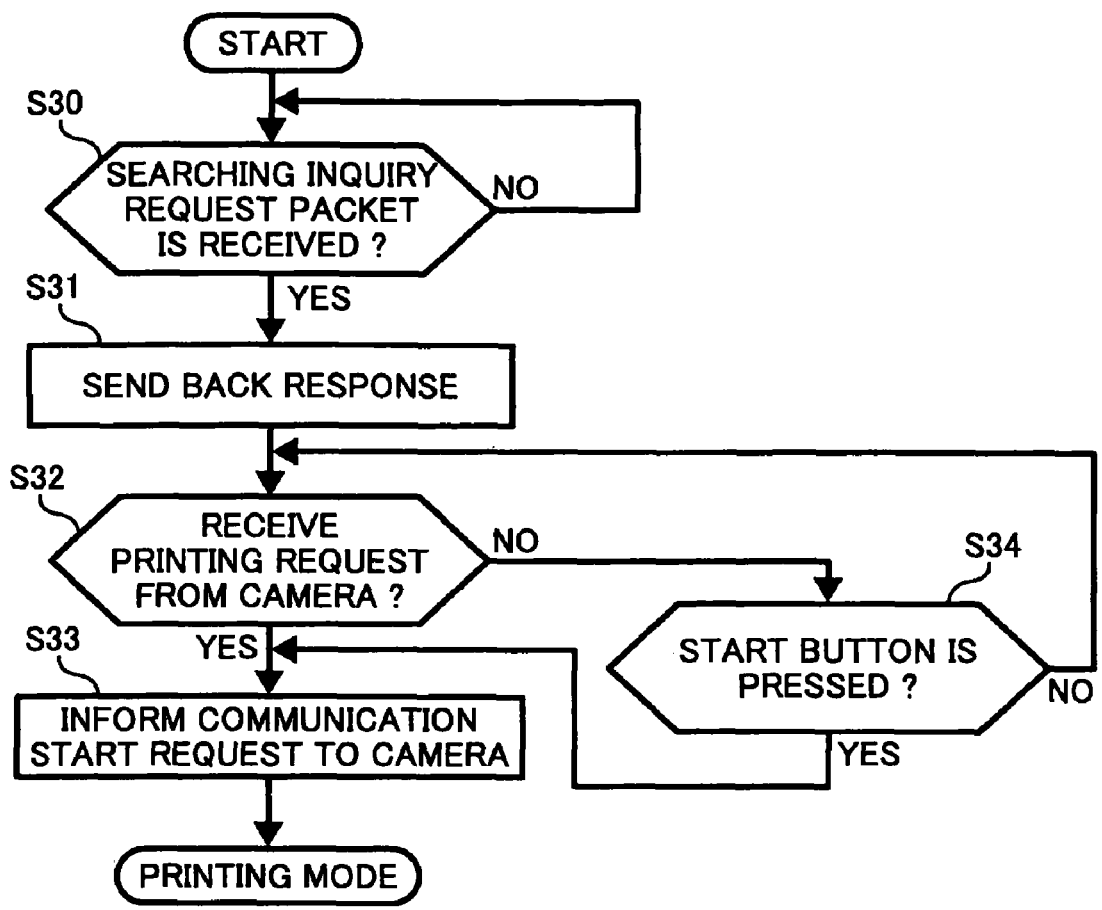
FIG. 10 shows a flowchart explaining operation of a printer side.

In FIG. 9, if printing is instructed from the console 14 (step S10), the camera 1 broadcasts the searching inquiry request packet (FIG. 6) to the network (step S11). In the side which receives the searching inquiry request packet (i.e., printer 2), a server program is operated, and the printer 2 always waits for the searching inquiry request packet. If the printer 2 receives the searching inquiry request packet, the printer 2 sends back the searching inquiry response packet (FIG. 7) to the camera 1 that the searching inquiry request is sent. The camera 1 waits for receiving the searching inquiry response packet (step S12), and if the camera 1 receives the searching inquiry response packet, the camera 1 stores the response packet in the response device list data in a memory (step S14). FIG. 18 shows an example of data packet structure. The portion corresponding to the data C in the TCP packet structure is the packet structures shown in FIGS. 6-8.

In step S12, if the camera 1 does not receive the response data, the camera 1 determines how much time has passed since the beginning of receiving of the response data (step S13), and if a predetermined time has not passed, the camera 1 continuously waits for the response data. If a predetermined time has passed, the response device list during being stored is displayed on the display device 13 as timeout (step S15), and the camera becomes the searching sending mode.

The above operation is activated by the printing instruction from the console 14 as a trigger signal. However, in order to quickly operate, the above operation can be activated by turning on the power as a trigger signal. In this case, the camera can immediately start from the display operation of step S16 by the printing instruction.

In the searching sending mode, the camera waits for two events of selection from the response device list (step S16) and the communication start request (step S19) from the printer 2. If the response device is selected from the list, the camera 1 informs the printing request to the selected printer 2 (step S17), and the camera 1 waits for the communication start request to be informed from the printer 2 (step S18). In the printing mode, an image transfer protocol is used between the printer 2 and the camera 1 to perform the communication. The image transfer protocol includes various communication protocols such as FTP (File Transfer Protocol), but these are known arts; thus, here, the detailed explanation will be omitted.

In step S19, if the camera 1 receives the communication start request from the printer 2, the camera 1 broadcasts the searching complete packet (step S20), and the camera 1 moves on to the printing mode. The communication start request deals the connection request of the communication protocol as the communication start request. In case of FTP, the connect request is dealt as the communication start request.

In FIG. 10, if the printer 2 receives the searching inquiry request packet from the camera 1 (step S30), the printer 2 sends back the response packet (step S31), and the printer 2 becomes the searching receiving mode. If the printer 2 becomes the searching receiving mode, the printer 2 does not respond to the searching inquiry request packet from another camera.

In the searching receiving mode, the printer 2 waits for two events of the receiving of the printing request from the camera 1 (step S32) and the printing operation (step S34) from the console 24. In step S32, if the printer 2 receives the printing request as in the step S17 (reference to FIG. 9) from the camera 1, the printer 2 informs communication start request to the camera 1 (step S33), and the printer moves on to the printing mode. If the printing operation is performed from the console 24 (step S34), the printer 2 informs the communication start request to the camera 1 (step S33), and the printer moves on to the printing mode. When the printer becomes the printing mode, the printer responds to the searching inquiry request packet from another camera.

In the searching receiving mode, if a predetermined time, for example, 30 minutes has passed after receiving the searching inquiry request packet, the printer may get back to an original initial state to wait for the receiving of the searching inquiry request packet from another camera. Moreover, when the printer receives the searching complete packet from the camera 1, the printer gets back to the initial state.

In the searching receiving mode, camera-specific information such as the IP address of camera 1 or the name of camera may be extracted from the received searching inquiry request packet to be displayed. If the information is displayed, it can be determined whether or not the printer is already reserved for printing by another camera.

In step S32, if the printer 2 receives the printing request, the printer may enter the printing mode regardless of the searching receiving mode. This is a response when the camera directly designates the printer for printing without entering the searching mode.

According to the present embodiment, when a plurality of printers is connected to the network, the communication state is obtained by simply pressing the start button of desired printer, so as to start the printing. Therefore, it is avoidable that image data is printed out by an improper printer.

Second Embodiment

Figure 11:
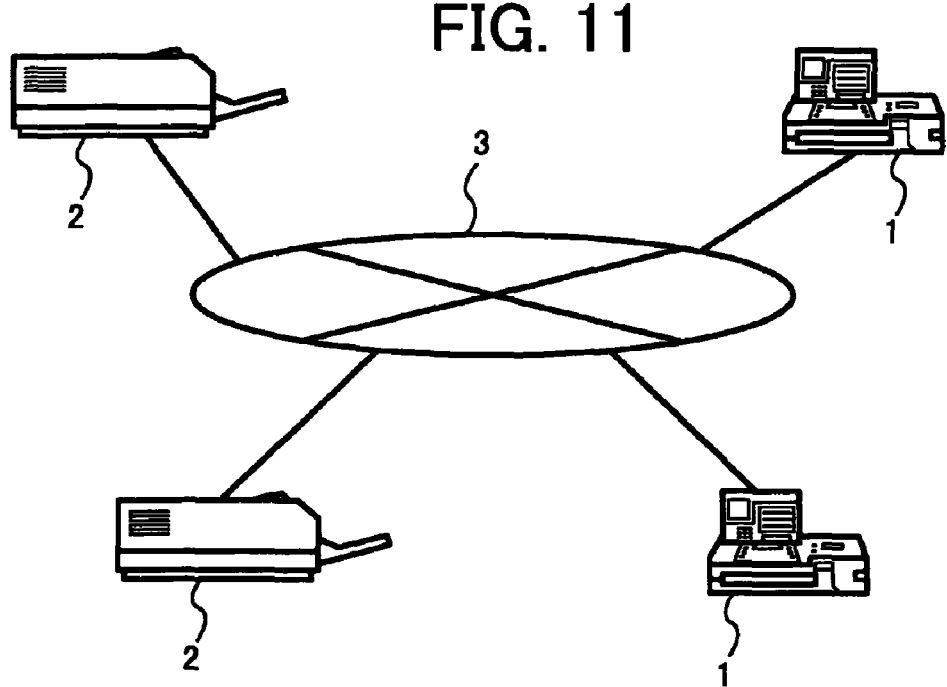
FIG. 11 shows a schematic diagram of an image transfer system according to a second embodiment.

Next, the second embodiment of the present invention will be described. In the present embodiment, as shown in FIG. 11, a plurality of digital cameras 1 (here, two cameras) as information terminal devices and a plurality of printers 2 (here, two printers) are connected to a IAN 3.

Figure 12:
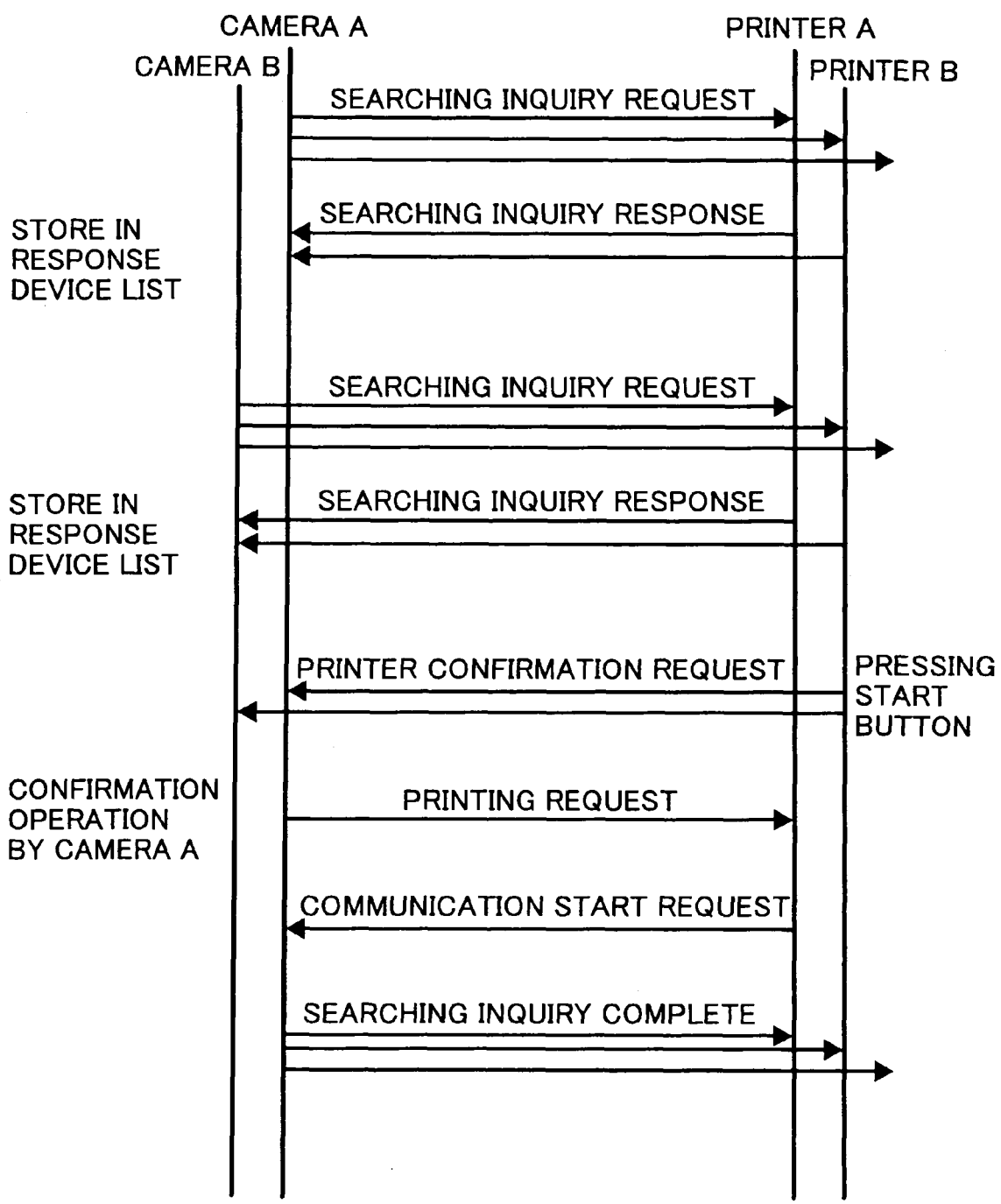
FIG. 12 is a sequence view illustrating a procedure which sends a communication start request command to a specific camera from a printer side by pressing a start button of printer, when a plurality of cameras is used.

In the present embodiment, a communication procedure until the connection between cameras A, B as the digital cameras 1 and printers A, B as the printers 2 is established is set as shown in FIG. 12.

At first, as shown in FIG. 12, the camera A broadcasts a searching inquiry request to a plurality of printers A, B. In this case, the packet structure of searching inquiry request is as the above FIG. 6.

If the searching inquiry request is broadcasted, each of the printers A, B sends a searching inquiry response to the camera A. The camera A stores the response in the response device list. In this case, the packet structure of searching inquiry response is as the above FIG. 7.

Next, the camera B broadcasts a searching inquiry request to a plurality of printers A, B . . . . In this case, the packet structure of searching inquiry request is as the above FIG. 6.

If the searching inquiry request is broadcasted, each of the printers A, B . . . sends a searching inquiry response to the camera B, and the camera B stores the response in the response device list. In this case, the packet structure of searching inquiry response is as the above FIG. 7.

If a user desires to print out image data in the camera A or camera B by the printer A, and presses the start button of the printer A, a printer confirmation request is sent to the cameras A, B from the printer A. In this case, the packet structure of printer confirmation request is as shown in FIG. 13.

When the printer confirmation request is sent, for example, the camera A responds, and sends a printing request to the printer A. In this case, the packet structure of printing request is as the above explained FIG. 8.

When the printing request is sent, the printer A sends a communication start request to the camera A. Thereby, the connection is established between the camera and the printer A. Finally, the camera A broadcasts a searching inquiry complete packet to each of the printers A, B . . . .

Next, operation of image transfer system according to the present invention will be explained with reference to the flowchart shown in FIG. 15. In addition, FIG. 15 shows the operation in the printer 2 side.

Figure 15:
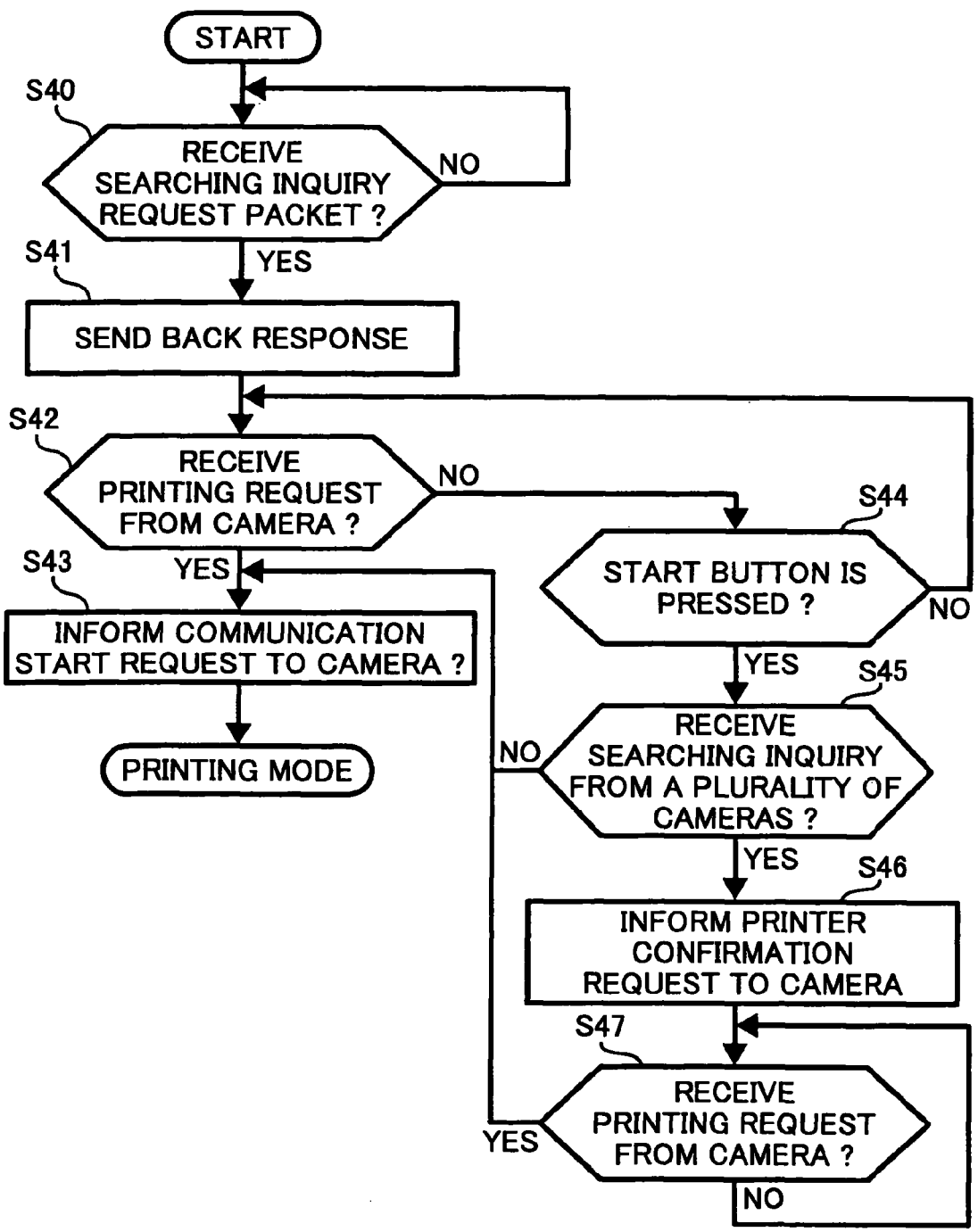
FIG. 15 illustrates a flowchart describing operation of a printer side.

In FIG. 15, if the printer 2 receives the searching inquiry request packet from the camera (step S40), the printer 2 sends back the response packet (step S41), and the printer becomes a searching receiving mode. The printer responds to the searching inquiry packet request from another camera even in the searching receiving mode. Therefore, the printer 2 registers IP address and terminal name in a searching inquiry receiving registration table shown in FIG. 14 from the searching inquiry request packet.

In the searching receiving mode, the printer 2 waits for two events of the receiving of the printing request from the camera (step S42) and the printing operation from the console (step S44). If the printer receives the printing request as in the step S17 (reference to FIG. 9) from the camera, the printer informs the communication start request (step S43) to the camera, and the printer moves on to a printing mode. If a printing operation is conducted from the console (step S44), when a plurality of cameras is registered in the searching inquiry receiving registration table (step S45), the printer sends a printer confirmation request to all of the registered cameras (step S46). The camera which received the printer confirmation request displays a printing confirmation screen of FIG. 16 in the display device of the camera. If OK is operated in the camera side, the camera sends the printing request. If the printer side receives this printing request (step S47), the printer informs the communication start request to the camera (step S43), and the printer moves on to the printing mode. Accordingly, the printing can be performed by selecting a specific camera.

The minimum required information for the searching inquiry receiving registration table is only IP address, but terminal name is registered considering the case which displays the camera list in the printer side when the start button is pressed. When the camera is specified in the display device or console of the printer side, the printer can start from the step S43 after specifying the camera, and move on to the printing mode. FIG. 19 shows the searching inquiry receiving registration table.

According to the present embodiment, the printer can respond to the searching inquiry request packet from another camera when the printer enters the searching receiving mode.

Although the present invention has been described in terms of exemplary embodiments, it is not limited thereto. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image transfer system, comprising:
   a plurality of printers to connect to a network to output image data received through the network, and to send a searching inquiry response including a respective network address in response to a searching inquiry request; and
   an information terminal device
      to broadcast the searching inquiry request through the network to each of the printers, the searching inquiry request instructing the printers that a time period for transmission of a communication start request has begun,
      to broadcast, after receipt of a communication start request from one of the printers selected at the information terminal device and identified by a print request command sent to the selected printer, a searching inquiry complete notification to each of the printers instructing the printers that the time period for transmission of the communication start request has ended and to refrain from transmission of a communication start request, and
      to broadcast, after one of the printers is selected from a console of one of the printers and a communication start request is received from the selected printer, the searching inquiry complete notification to each of the printers.

2. The image transfer system according to claim 1, wherein one of the printers is selected to output the image data by pressing a start button of the one of the printers.

3. The image transfer system according to claim 2, wherein the information terminal device is further configured to select one of the printers to output the image data.

4. The image transfer system according to claim 3, wherein a plurality of information terminal devices are connected to the network.

5. The image transfer system according to claim 2, wherein a plurality of information terminal devices are connected to the network.

6. The image transfer system according to claim 1, wherein a plurality of information terminal devices are connected to the network.

7. The image transfer system according to claim 1, wherein the information terminal device comprises a digital camera.

8. The image transfer system according to claim 1, wherein the information terminal device is further configured to determine an amount of time passed since sending the searching inquiry request, and, if the determined amount of time is greater than a predetermined time, display a list of printers on a display of the information terminal device based on searching inquiry responses received from the printers.

9. An image transfer method, comprising the steps of:
   connecting an information terminal device and a plurality of printers to a network, so as to output image data from the information terminal device at any of the printers via the network;
   broadcasting a searching inquiry request to each of the printers by the information terminal device, the searching inquiry request instructing the printers that a time period for transmission of a communication start request has begun;
   sending a searching inquiry response including a respective network address from each of the printers to the information terminal device, in response to the searching inquiry request;
   broadcasting, after receipt of a communication start request from one of the printers selected at the information terminal device and identified by a print request command sent to the selected printer, a searching inquiry complete notification to each of the printers instructing the printers that the time period for transmission of the communication start request has ended and to refrain from transmission of a communication start request; and
   broadcasting, after one of the printers is selected from a console of one of the printers and a communication start request is received by the information terminal device from the selected printer, the searching inquiry complete notification to each of the printers.

* * * * *